United States Patent Office 3,692,619
Patented Sept. 19, 1972

3,692,619
PROTECTIVE BANDAGE FOR PIPELINES TO BE PROTECTED AGAINST CORROSION
Benno Wedekind and Werner Kirsch, both of Felderstr. 24, Leverkusen-Rheindorf, Germany
Filed Feb. 9, 1970, Ser. No. 9,737
Claims priority, application Germany, Mar. 1, 1969, G 69 08 286.6
Int. Cl. B32b 3/00
U.S. Cl. 161—88          2 Claims

ABSTRACT OF THE DISCLOSURE

A bandage for protecting pipelines against corrosion is disclosed which is formed from a plastically and elastically deformable plastic tape. The plastic tape is adhesive on both sides and spaced apart reinforcing strips are provided on at least both longitudinal edges and on one side of the tape.

---

Figure 1:
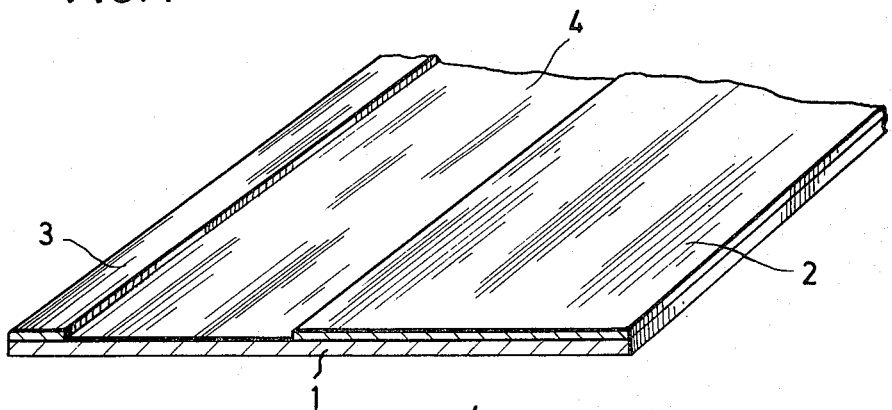

This invention relates to a protective bandage for pipelines to be protected against corrosion, the bandage comprising a plastic-elastic plastics tape which is adhesive on both sides and which is provided on part of one side with a reinforced region for example in the form of a film bonded to the tape The term plastic-elastic plastics tape employed herein refers to plastic tapes which are plastically and elastically deformable and are known in the art of protective bandages. More particularly, the invention relates to an anti-corrosion bandage for metal pipelines to be laid in the ground.

Underground pipelines of steel are protected against corrosion by means of wrappings of bitumen or plastics which are actually applied during manufacture of the pipes in such a way that the pipe ends required for welding remain free. The welded pipe sections are then wrapped by hand with further protective bandages after they have been welded together and before they are laid in the ground.

In the case of pipes wrapped in bitumen at the factory, bitumen bandages approximately 4 mm. thick which have to be applied under heat are generally used for this purpose. The application of these bandages by hand is both difficult and time-consuming and calls for special experience on the part of the fitter if faults are to be reliably avoided.

In contrast, a protective covering consisting of two wound layers applied helically with a 50% overlap, has proved to be effective in insulating the welds between plastics-clad pipes. The inner covering layer consists of a plastic-elastic plastics material adhesive on both sides. The individual turns stick or weld together in the overlap zone of the two layers to form an impervious tubular structure, particularly advantageous for preventing corrosion, which clings tightly to the tube or pipe to be protected.

In some cases, pipes are also made without any insulation. After they have been welded, these pipes have to be provided on site with an anticorrosion covering over the entire length of the pipelines. By its sealing effect, this covering prevents the metal pipes from corroding in the ground.

Generally, far too much expense would be involved in the manual application on site of protective coverings in the form of tapes or bandages over the entire length of pipelines for the transport of oil, petrochemical intermediate products, gas and water. In order therefore to ensure the rapid completion of work, it is imperative to use winding machines. Machines of this kind involve only limited manual labour. The manual work involved in the application of anti-corrosion coverings to long pipelines is unfavourable in view both of the physical strain upon the fitter and of the considerable amount of time involved so that motor-driven winding machines are preferably used for these purposes. However, this presupposes that, on account of the considerable mechanical stressing which accompanies winding, the bandages used as anti-corrosion coverings are so strong that, although they "tighten" to a limited extent as required, they are not deformed or torn either on one or both sides through elongation or distortion.

Unfortunately, the danger of undesired deformation or tearing attributable to over-elongation in protective bandages applied by machine is very real in the case of plastic-elastic bandages which in the overlap zone weld together to form an impervious tubular structure and which adhere firmly to the objects to be protected. To be able to apply protective materials of this kind by machine, the bandage has to be reinforced. The hand-wound protective bandage described in German utility model specification 1,977,267 with a film covering applied to one side for other reasons is not suitable for this purpose.

An object of the present invention is to provide a tear-proof and stretch-proof protective bandage of a plastic-elastic plastics material which is intended to be wound helically around objects to be protected from corrosion, such as pipelines, and which material adheres firmly in the overlap zone and shows a marked tendency for "welding together" or "self-adhesion" of the individual layers of the bandage.

To achieve this object, it is proposed in regard to a protective bandage of the kind referred to above that a reinforcing strip should be provided along at least both longitudinal edges of the plastics tape. These reinforcing strips are made of a more stretch-proof material than the plastics tape so that although their favourable properties which enable them to cling to and adhere to the objects to be protected are utilised, deformation or even destruction on one side is avoided.

Preferably, the protective bandage is provided with at least two reinforcing strips of a thermoplastic plastics material, woven fabric on its own or coated or impregnated with a plastics material or of any other material which is more stretch-proof than the plastics tape material which forms the major part of the bandage.

For example, the plastics tape of the bandage has two reinforcing strips on one side, the reinforcing strip provided along one longitudinal edge covering about 40% to 60% and preferably 55% of the plastics tape, whilst the reinforcing strip provided along the other longitudinal edge covers from 5% to 20% and preferably 10% of the plastics tape.

On the other hand, the bandage may also have several reinforcing strips distributed at regular or irregular intervals from one another over the width of the plastics tape. Each of these strips is about 15 to 25 mm. and preferably 20 mm. wide.

By using the bandages according to the invention for protecting pipes, pipelines or the like laid in the ground, it is possible to apply the necessary firm and durable anti-corrosion covering on site by machine without any undesirable stretching or even tearing of the bandage. In fact, the bandage has the necessary strength to withstand even mechanical stressing occurring underground. Since the bandage cannot be non-uniformly stretched on one side or otherwise, it clings smoothly to the substrate in the absence of ripples or the like when wound helically on to pipes or pipelines and adheres tightly and uniformly to the substrate.

Figure 2:
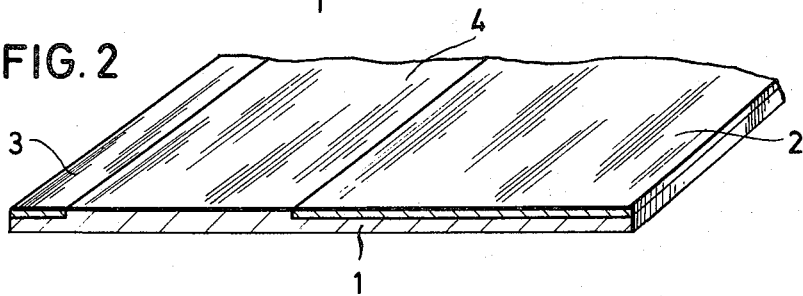
Figure 3:
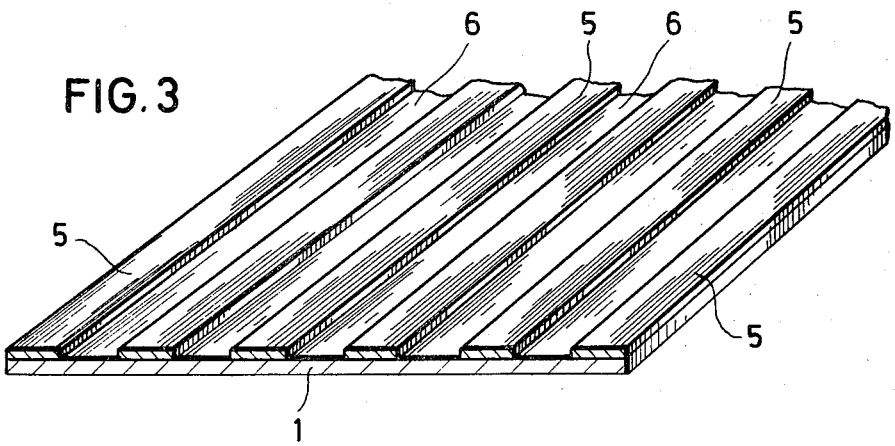

Sections cut out of three embodiments of the protective bandage according to the invention are diagrammatically illustrated on an enlarged scale in FIGS. 1, 2 and 3 of the accompanying drawings.

According to FIG. 1, the anti-corrosion bandage consists of a plastic-elastic plastics tape 1 provided on its surface with two reinforcing strips 2 and 3, consisting for example of thermoplastic plastics film. The wider reinforcing strip 2 covers about 55% of the width of the plastics tape 1, whilst the narrower reinforcing strip 3 covers from about 5% to 20% and preferably 10% of the width of the plastics tape. Between the two reinforcing strips 2 and 3 there remains a wide uncovered section 4 of the plastics tape 1 so that when the bandage is wound helically onto a pipe (not shown) the next overlapping layer is firmly united with the underlying section 1 of the plastics tape 1 and the wound bandage "welds" to form a continuous impervious anti-corrosion tubular bandage.

The only difference between the embodiment shown in FIG. 2 and the embodiment shown in FIG. 1 is that the reinforcing strips 2 and 3 are let into the plastics tape 1 in the embodiment of FIG. 2.

According to FIG. 3, narrow reinforcing strips 5 are applied at regular intervals to the upper surface of the plastics tape 1. Between each of them there remains an uncovered section 6 of the plastics tape 1. The reinforcing strips 5 are about 15 to 20 mm. wide and can also be arranged at irregular intervals apart. However, it is important that one reinforcing strip 5 should be provided along each longitudinal edge of the plastics tape 1. The reinforcing strips 2, 3 and 5 may consist of thermoplastic plastics film or even of optionally coated or impregnated fabrics.

The protective bandage according to the invention in all its forms can be continuously wound around pipelines of all kinds. The wound protective layer does not have any breaks or leaky points even around welded joints or irregularities in the surface of the pipe.

We claim:

1. A bandage for protecting pipelines against corrosion, said bandage comprising a tape of a plastically and elastically deformable plastic material which is adhesive on both sides, wherein the tape is provided on one side thereof with two reinforcing strips, one reinforcing strip being arranged along one longitudinal edge of said tape covering from 40% to 60% of the width of the tape while the other reinforcing strip is arranged along the other longitudinal edge of said tape covering from 5% to 20% of the width of the plastic tape, with the remaining, intermediate section of such tape being free of reinforcement.

2. The bandage of claim 1 wherein said reinforcing strips are of a material selected from the group consisting of a thermoplastic plastics material, a woven fabric, or a woven fabric coated or impregnated with a thermoplastic plastics material.

References Cited

UNITED STATES PATENTS

| | | | |
|---|---|---|---|
| 3,388,723 | 6/1968 | McNulty | 161—236 |
| 2,610,936 | 9/1952 | Carlson | 161—57 |
| 3,321,357 | 5/1967 | Kennedy | 156—178 |

ROBERT F. BURNETT, Primary Examiner

J. J. BELL, Assistant Examiner

U.S. Cl. X.R.

138—137, 140; 161—144, 145, 167